US000001966H

(19) United States

(12) Statutory Invention Registration (10) Reg. No.: US H1966 H

Henry, IV et al. (43) Published: Jun. 5, 2001

(54) INTEGRATED MOTOR/GEAR PUMP

(75) Inventors: John W. Henry, IV, Annapolis; William F. Flickinger, Arnold; Thomas E. Calvert, Severna Park; Robert C. Smith; James S. Slebzak, both of Annapolis, all of MD (US)

(73) Assignee: The United States of America as represented by the Secretary of the Navy, Washington, DC (US)

(21) Appl. No.: 08/919,225

(22) Filed: Aug. 28, 1997

(51) Int. Cl.[7] ..... F04B 17/00

(52) U.S. Cl. ..... 417/356; 417/410.4

(58) Field of Search ..... 417/356, 410.4

(56) References Cited

U.S. PATENT DOCUMENTS

| | | | | |
|---|---|---|---|---|
| 2,386,896 | * | 10/1945 | Hill et al. | 230/141 |
| 2,760,348 | * | 8/1956 | McAdam | 62/117.3 |
| 4,459,087 | * | 7/1984 | Barge | 417/356 |
| 5,145,329 | * | 9/1992 | Zumbusch et al. | 417/356 |
| 5,360,325 | | 11/1994 | Henry, IV et al. . | |

* cited by examiner

*Primary Examiner*—Michael J. Carone

(74) *Attorney, Agent, or Firm*—Jacob Shuster; John Forrest

(57) ABSTRACT

Pinion and ring gears intermeshed at one location within a pump chamber are rotationally supported therein by a cylindrical bearing portion of a housing sealingly enclosing said pump chamber between side plates of the housing within which stator windings are mounted in operative alignment with permanent magnets carried in one of the gears acting as a motor rotor as a result of interaction between such magnets and magnetic fields produced by electrical input power fed to the stator windings.

7 Claims, 4 Drawing Sheets

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

FIG. 2
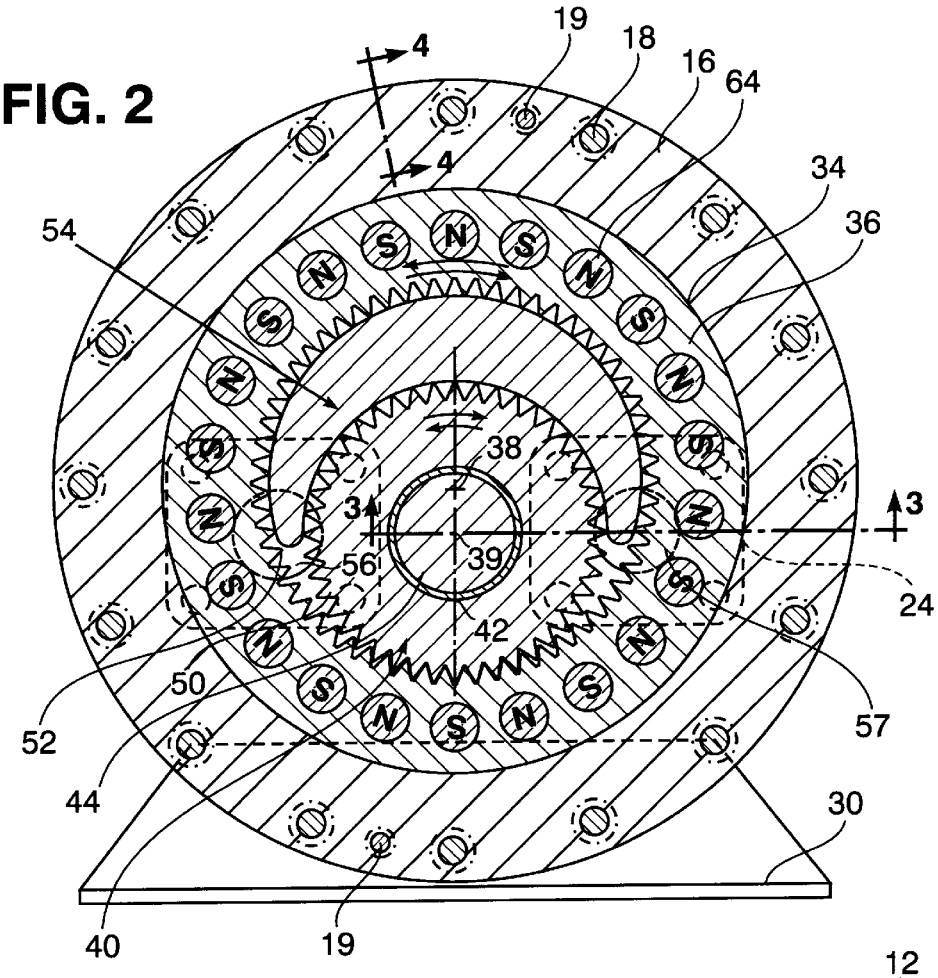
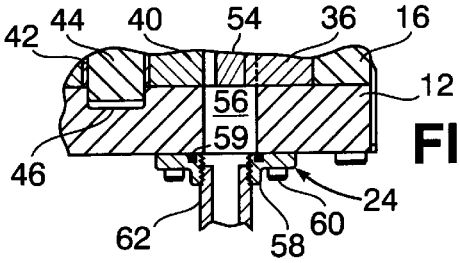
FIG. 3
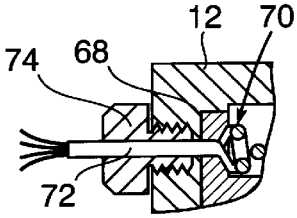
FIG. 4
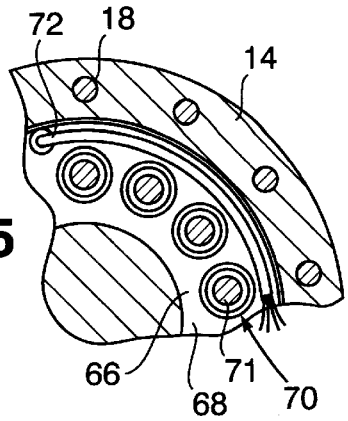
FIG. 5

FIG. 6
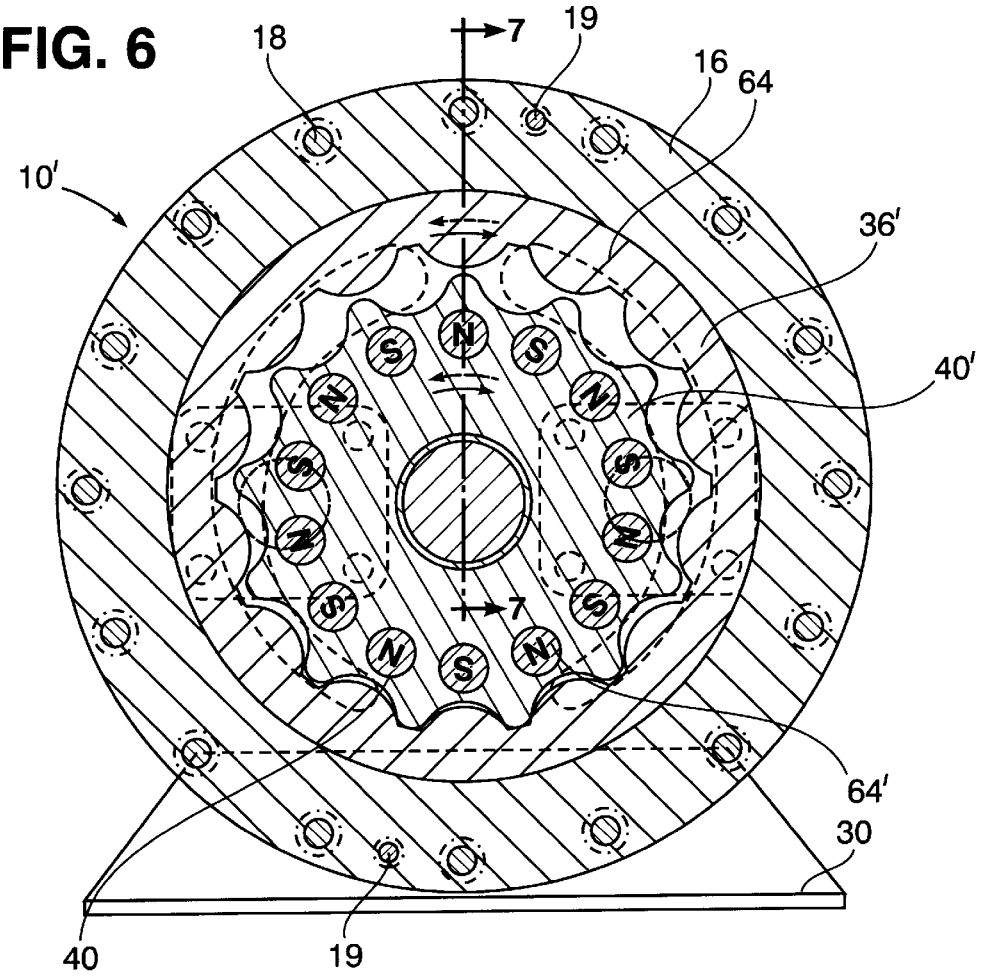
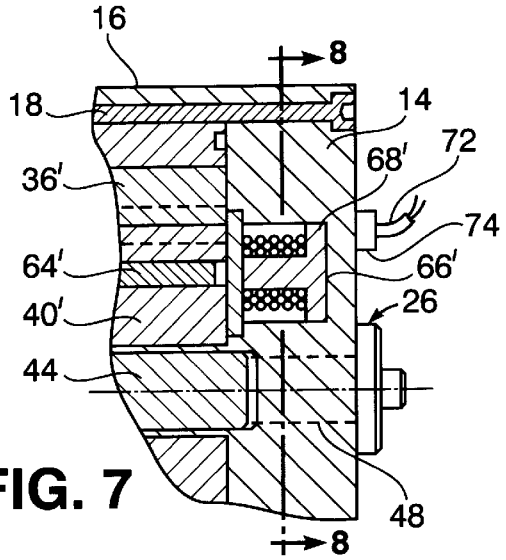
FIG. 7
FIG. 8
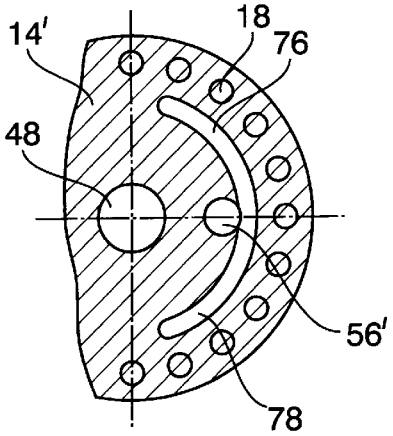

INTEGRATED MOTOR/GEAR PUMP

The present invention relates in general to a gear pump driven by an electric drive motor internally formed therein.

BACKGROUND OF THE INVENTION

Gear pumps which feature polytoothed pinion and ring gears enmeshed at one location within a pump chamber so as to act as impellers for displacement of fluid in response to rotational torque applied to the pinion gear, are generally well known in the art as disclosed for example in U.S. Pat. No. 5,360,325 to Henry, IV et al. Such gear pumps are characterized by operation with substantially reduced noise and have been used for displacement of oil. Also, such gear pumps have been driven by external drivers coupled thereto, such as electric motors. Various problems are however associated with the foregoing type of gear pump often related to the type of fluid being displaced, restricted space requirements and handling of unbalanced axial forces. It is therefore an important object of the present invention to provide the foregoing type of gear pump which avoids leakage, size and installational support problems and other restrictions heretofore associated therewith.

SUMMARY OF THE INVENTION

In accordance with the present invention a reduced noise type of gear pump, formed by enmeshed pinion and ring gears rotatable about closely spaced offset axes within a pump chamber enclosed by a cylindrical bearing portion of a housing rotationally supporting the gears, is sealed between side plates within which stator windings are sealingly mounted as part of an integrated electric motor involving generation of magnetic fields produced internally in response to supply of multi-phase electrical power to the stator windings. Such magnetic fields operatively aligned with permanent magnets disposed within one of the gears as the motor rotor interact therewith to exert rotational torque thereon. By directional control of electrical power input to the stator windings, reversible pump operation is effected by internally motorizing one of the gears for displacement of fluid by the gear teeth acting as impellers.

BRIEF DESCRIPTION OF DRAWING FIGURES

A more complete appreciation of the invention and many of its attendant advantages will be readily appreciated as the same becomes better understood by reference to the following detailed description when considered in connection with the accompanying drawing wherein:

FIG. 2 is a section view taken substantially through a plane indicated by section line 2—2 in FIG. 1;

Figure 1:
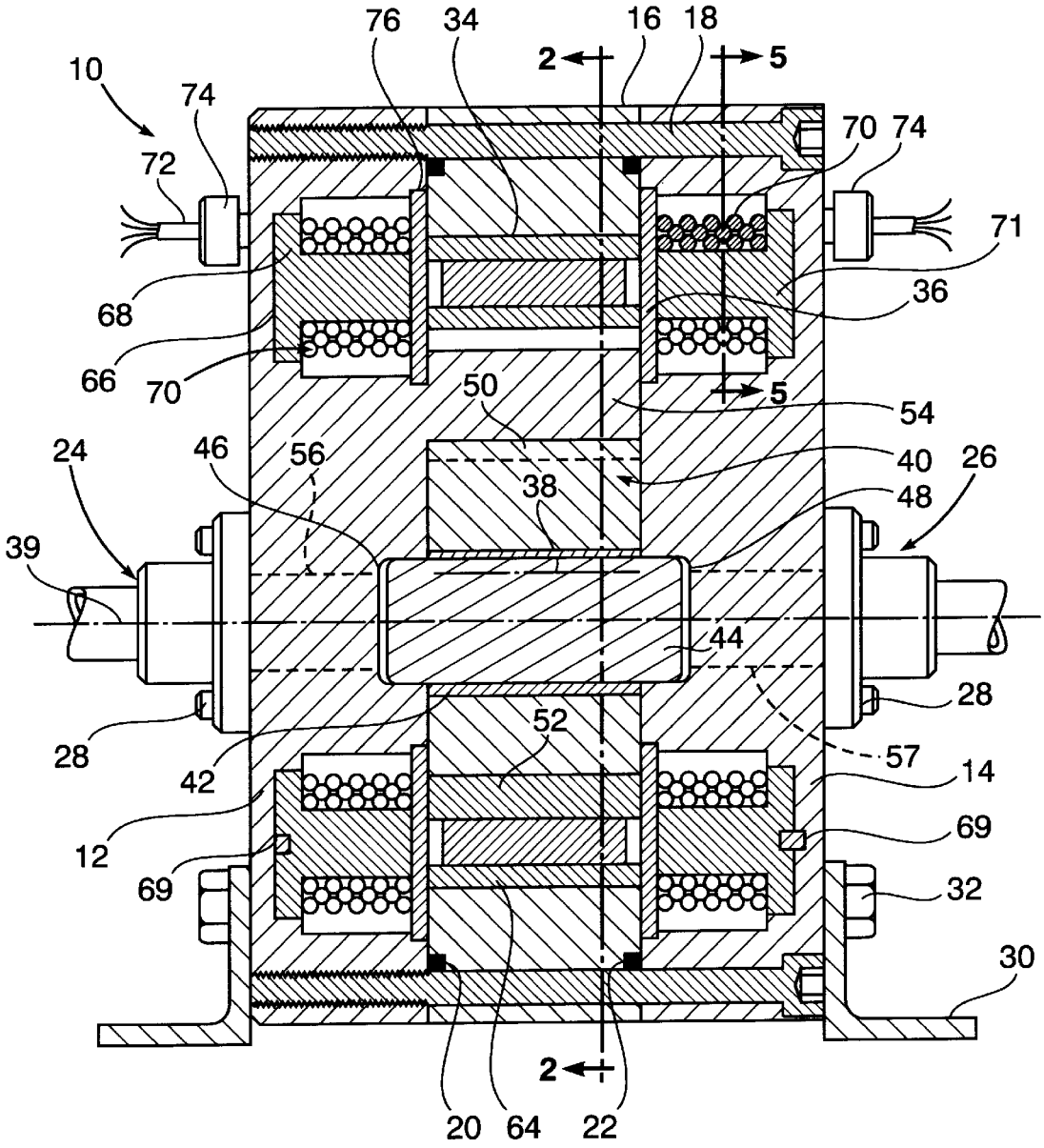
FIG. 1 is a side section view of an integrated motor/pump unit in accordance with one embodiment of the invention.
Figure 9:
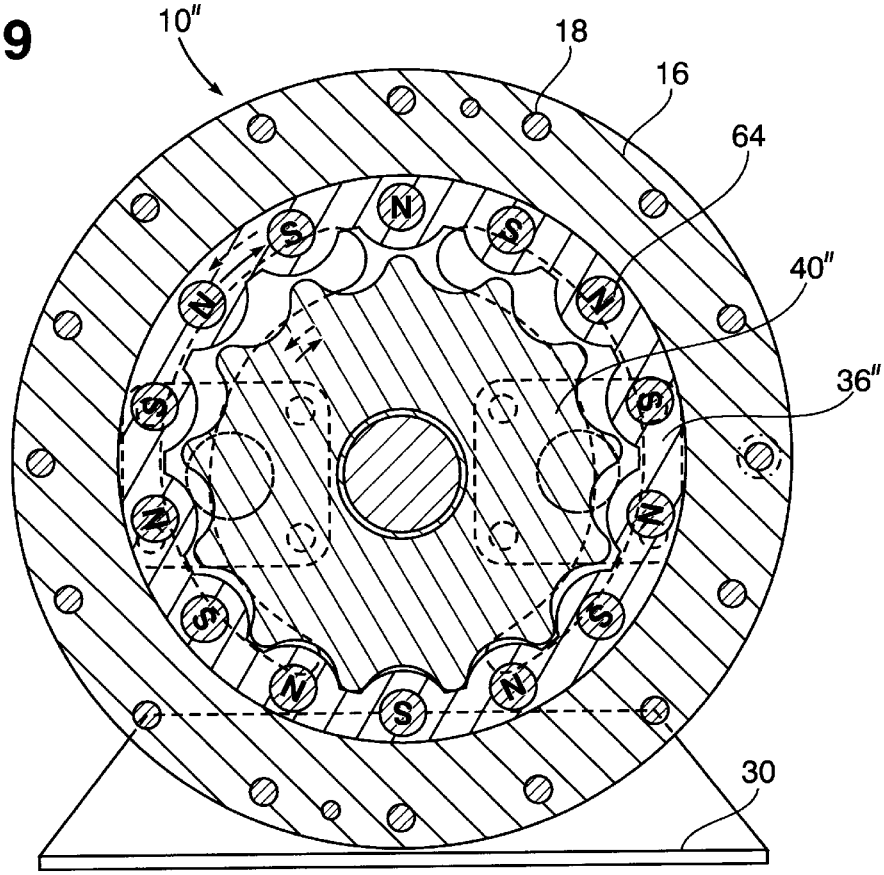
Figure 10:
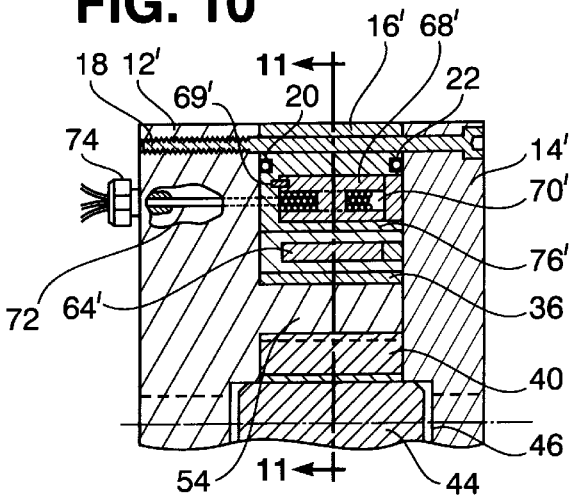
Figure 11:
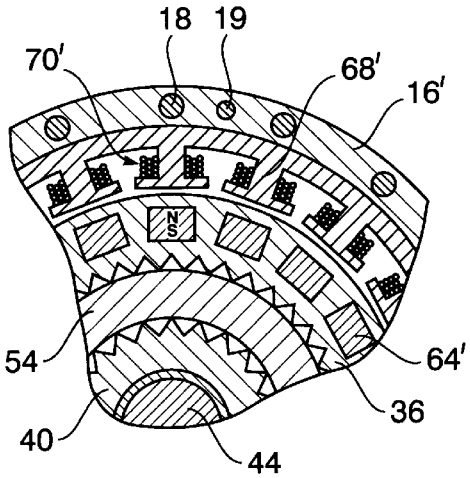

FIGS. 3 and 4 are partial section views taken substantially through planes indicated by section lines 3—3 and 4—4 in FIG. 2;

FIG. 5 is a partial section view taken substantially through a plane indicated by section line 5—5 in FIG.1;

FIG. 6 is a section view corresponding to that of FIG. 2, illustrating a second embodiment of the invention;

FIG. 7 is a partial section view taken substantially through a plane indicated by section line 7—7 in FIG. 6;

FIG. 8 is a partial section view taken substantially through a plane indicated by section line 7—7 in FIG. 7;

FIG. 9 is a section view corresponding to those of FIGS. 2 and 6, illustrating a third embodiment of the invention;

FIG. 10 is a partial side section view of an integrated motor/pump unit in accordance with yet another embodiment; and FIG. 11 is a partial section view taken substantially through a plane indicated by section line 11—11 in FIG. 10.

DETAILED DESCRIPTION OF PREFERRED EMBODIMENTS

Referring now to the drawing in detail, FIG. 1 illustrates in side section an integrated motor/pump unit generally referred to by reference numeral 10 having a housing formed by a pair of flat circular side plates 12 and 14 axially separated by a circular bearing cylinder 16 to which the plates are secured after being radially aligned therewith. A plurality of circumferentially spaced fastener bolts 18 extend from the plate 14 through the cylinder 16 and are threadedly received within the plate 12 to interconnect the plates and cylinder, while precise radial alignment is achieved by two dowels 19 as shown in FIG. 2 extending parallel to the bolts 18 through the plates and cylinder. A pair of annular seals 20 and 22 are respectively carried by the cylinder 16 on opposite axially sides thereof for contact with the side plates 12 and 14 in close radially spaced relation to the bolts 18 so as to seal an internal pump chamber within the cylinder 16 between the plates 12 and 14. Inlet and outlet ports formed by fluid passage assemblies 24 and 26 are secured by external fasteners 28 to the side plates so as to conduct fluid flow for entry into and exit from the internal pump chamber as hereinafter described in detail. A pair of bases 30 are respectively secured by fasteners 32 to the side plates 12 and 14 for support of the assembled motor/pump unit 10 on some surface.

With reference to both FIGS. 1 and 2, the pump chamber has a radially outer circular bearing surface 34 on the cylinder 16 in contact with a circular ring gear 36 thereby supported for rotation about an axis 38 offset by a short distance from a rotational axis 39 of a pinion gear 40 rotatably supported within the pump chamber by a sleeve 42 on a short shaft 44 axially positioned at opposite axial ends thereof within annular recesses 46 and 48 formed within the side plates 12 and 14 as shown in FIG. 1.

As shown in FIG. 2, the pinion gear 40 of smaller diameter than the ring gear 36 has external gear teeth 50 enmeshed with internal gear teeth 52 of the ring gear 36 at a location angularly spaced 180° about its rotational axis 39 from a location of maximum radial spacing between the pinion and ring gears within the pump chamber enclosed by the cylinder 16. A substantial portion of the chambers volume between the pinion and ring gears is occupied by a crescent formation 54 fixed to the side plate 12 as shown in FIG. 1. The unoccupied portions of the chamber of reduced volume spaced by 180° from each other are in fluid communication with the fluid passage port assemblies 24 and 26 through bores 56 and 57 respectively formed in the housing side plates 12 and 14 as more clearly seen in FIG. 3. Each of the assemblies 24 and 26 includes a flange 58 having an O-ring seal abutting the housing side plate 12 or 14 to which it is secured by fasteners 60 for threadedly receiving an axial end of a flow passage tube 62 in axial alignment with the bore 56 or 57 to form an entry or exit port, depending on rotational direction of flow of fluid such as water through the pump chamber. Such water is displaced by the teeth 50 and 52 of the gears acting as impellers during rotation thereof. Such rotation is induced by a motor action involving application of rotational torque to one of the gears acting as a motor rotor.

According to the embodiment illustrated in FIGS. 1 and 2, it is the ring gear 36 that is rendered operative as a motor rotor by placement therein of a plurality of circumferentially spaced permanent magnet elements 64 so orientated that magnetic flux lines associated therewith extend axially therethrough. The axial end poles of alternate permanent magnet elements 64 are of opposite polarity and in spaced adjacency to the confronting surfaces of the housing side plates 12 and 14, having annular grooves 66 formed therein within which stators 68 are disposed, fixed by pins 69 to the side plates to prevent rotation thereof. The stators 68 are made of ferromagnetic material so as to provide multiple poles 71 as shown in FIG. 5, wherein each pole is wound with insulated wiring to form stator windings 70. Power input wiring 72 is connected to the stator windings 70 within each of the housing plates 12 and 14, extend from hermetic holders 74 threadedly mounted in and projecting from each of the housing side plates as more clearly seen in FIG. 4. Reversible, multiphase electrical voltage power from an external source is thereby supplied to the stator windings 70 located within the grooves 66 in the housing side plates 12 and 14 and sealed therein from the pump chamber by thin, non-magnetic discs 76 as shown in FIG. 1. When so supplied with electrical input power through wiring 72, the stator windings 70 produce magnetic fields which interact with the permanent magnets 64 to apply rotational torque to the ring gear 36. The number of stator phases, number of poles and their shape, the size of windings and the number, shape and strength of the permanent magnets is selected in accordance with electric motor principles dependent on desired torque and speed for drive of the pump.

According to another embodiment of the invention, a motor/pump unit 10' of a type similar to that hereinbefore described also has enmeshed pinion and ring gears 40' and 36' with a different style gerotor impeller gear teeth as shown in FIG. 6. Also, permanent magnet elements 64 are positioned in the pinion gear 40' rather than the ring gear 36'. Accordingly, the pinion gear 40' acts as the motor rotor by virtue of the permanent magnet elements 64 being located therein for interaction with magnetic fields produced through axially aligned field windings on stators 68' located within annular grooves 66' in the housing side plates as shown in FIG. 7. In this embodiment, no crescent formation is provided to volumetrically reduce the unoccupied portion of the sealed pump chamber within the cylinder 16. Also, each housing side plate establishes fluid communication between the sealed pump chamber and the port passage assemblies through bores 56' from which arcuate grooves 76 and 78 extend as shown in FIG. 8. Such grooves 76 and 78 are respectively exposed to the pump chamber along radially separated portions of the gear teeth.

Yet another embodiment of an integrated motor/pump unit 10" is illustrated in FIG. 9 which is basically the same as the unit 10' hereinbefore described with respect to FIGS. 6, 7 and 8 except that permanent magnet elements 64 are positioned within the ring gear 36" rather than the pinion gear 40" for interaction with magnetic stator fields operatively aligned therewith. Accordingly, the stator grooves are radially repositioned within the housing side plates associated with the embodiment of FIG. 9 for axial alignment of the magnetic fields produced therethrough with the ring gear mounted permanent magnet elements 64, as in the case of the embodiment illustrated in FIGS. 1–5.

Referring now to FIGS. 10 and 11, yet another embodiment is shown corresponding to that of the integrated motor/pump unit shown in FIGS. 1–5, except for the location of motor stator 68' and windings 70' associated therewith within cylinder bearing portion 16' of the housing assembled between housing side plates 12' and 14'. The stator 68' is fixed by pins 69' as shown in FIG. 10 to the housing cylinder 16' while received within a radially outer annular gap formed therein. The stator 16' is sealed within such radial gap by an annular non-magnetic disc 76', and mounts the magnetic windings in radial alignment with permanent magnets 64' disposed within the ring gear 36 enmeshed with the pinion gear 40 rotatably supported within the pump chamber by shaft 44. The permanent magnets 64' differ from those hereinbefore described with respect to the other embodiments in that they are orientated so that opposite pole ends thereof are radially aligned with the magnetic stator windings 70' as shown in FIG. 11. Electrical input energy is supplied to such stator windings 70' through the wiring 72 extending through the holders 74 threadedly mounted in the housing side plate 12' as shown in FIG. 10, in order to power the motor/pump unit as hereinbefore described with respect to the other embodiments.

It should be apparent from the foregoing description of the integrated motor/pump units that because no externally driven shaft penetrates the housing formed by the assembled side plates and gear bearing cylinder, there is no unbalanced axial force requiring external bearing support and no rotating dynamic shaft seal to maintain. Reversible motor drive over a wide speed range is furthermore achievable by external control of the electrical input power delivered through the wiring 72. A quick response to such control is made possible since the usual rotor inertia of a separate drive motor is eliminated, as well as rotor torsional resonance, so as to improve acoustic performance. By adaptively controlling the motor drive input power signal, control may be exercised over fluidborne noise (pulsation) accompanying the pump output of the motor/pump unit. Such an integrated motor/pump unit of the present invention may also more readily accommodate selection of material to enable pumping of most any fluid including oils, fresh water and seawater.

Obviously, other modifications and variations of the present invention may be possible in light of the foregoing teachings. It is therefore to be understood that within the scope of the appended claims the invention may be practiced otherwise than as specifically described.

What is claimed is:

1. In combination with an internal gear pump having a housing enclosing a pump chamber within which a pair of gears are enmeshed at one location from which the gears separate during rotation thereof while acting as impellers for displacement of fluid between inlet and outlet ports connected to the housing, the improvement residing in: magnetic motor means sealed within the housing for imparting rotational torque to one of the gears to induce said rotation of the gears causing said displacement of the fluid through the pump chamber.

2. The improvement as defined in claim 1, wherein said magnetic motor means includes: a plurality of permanent magnets mounted within said one of the gears and stator winding means fixedly mounted within the housing in operative alignment with said permanent magnets for producing magnetic fields interacting with the permanent magnets within the pump chamber to exert said rotational torque on said one of the gears.

3. The combination as defined in claim 2, wherein said housing comprises: a pair of side plates having annular grooves within which the stator winding means is located; cylindrical bearing means axially separating the side plates in sealed relation to the pump chamber for rotational support of the gears therein; and sealant means covering the stator winding means within said annular grooves for sealing the pump chamber therefrom.

4. The combination as defined in claim 3, wherein said side plates are formed with flow passages therein extending between the inlet and outlet ports and the pump chamber angularly spaced from said one location at which the gears are enmeshed.

5. The combination as defined in claim 1, wherein said housing comprises: a pair of side plates; and cylindrical bearing means axially separating the side plates in sealed relation to the pump chamber for rotational support of the gears therein, said side plates being formed with flow passages therein extending between the inlet and outlet ports and the pump chamber angularly spaced from said one location at which the gears are enmeshed.

6. The improvement as defined in claim 5, wherein said magnetic motor means includes: a plurality of permanent magnets mounted within said one of the gears and stator winding means fixedly mounted within the housing in operative alignment with said permanent magnets for producing magnetic fields interacting with the permanent magnets within the pump chamber to exert said rotational torque on said one of the gears.

7. The combination as defined in claim 6, wherein said cylindrical bearing means of the housing has an annular gap within which the stator winding means is disposed.

* * * * *